United States Patent [19]

Cohn

[11] 4,351,548

[45] Sep. 28, 1982

[54] METHOD OF CONSTRUCTING TIRE AND IDENTIFICATION TAG THEREFOR

[75] Inventor: Alan E. Cohn, Akron, Ohio

[73] Assignee: The Goodyear Tire & Rubber Company, Akron, Ohio

[21] Appl. No.: 205,139

[22] Filed: Nov. 10, 1980

[51] Int. Cl.$^3$ .............................................. B42D 15/00
[52] U.S. Cl. ................................. 283/21; 152/330 D; 156/110 R; 283/19
[58] Field of Search ............... 152/330 D; 156/110 R; 283/19, 20, 21

[56] References Cited

U.S. PATENT DOCUMENTS 1,456,583  5/1923  Becker .................................. 283/20

FOREIGN PATENT DOCUMENTS 381631  9/1923  Fed. Rep. of Germany ........ 283/20

*Primary Examiner*—Paul A. Bell
*Attorney, Agent, or Firm*—H. C. Young, Jr.

[57] ABSTRACT

Method of constructing pneumatic tire where at least one of its elements is comprised of a heat-curable rubber composition, an improvement in which such composition is identified with a releasably attached identification tag containing an information-providing ink composition thereon, wherein the ink composition contains a heat activatable blowing agent. The invention further relates to the heat-curable rubber composition so-identified and also to the identification tag itself.

3 Claims, No Drawings

METHOD OF CONSTRUCTING TIRE AND IDENTIFICATION TAG THEREFOR

TECHNICAL FIELD

This invention relates to a method of building heat-cured rubber articles such as a pneumatic tire and to the corresponding article or tire. The invention further relates to identification tags for components for such articles and such tagged components. The invention additionally relates to the preparation or construction of a cured rubber tire from individually compounded, optionally shaped, rubber components.

BACKGROUND

Pneumatic rubber tires can conveniently be prepared by building previously compounded and shaped rubber components such as tread stock and sidewall stock onto a rubberized fabric carcass. The carcass including an inner liner of rubber gum stock. The prepared tire is then shaped and cured by application of heat and pressure.

An inherent difficulty involved in such tire preparation involves the storage and identification of individual compounded components prior to their utilization.

It is important to appreciate that, once the rubber is compounded with various materials including a curative therefor, it becomes a tacky, chemically active, productive stock. It is designed to be cured upon application of heat, or elevated temperature. It must be used in a relatively short time or it becomes aged or degraded.

It is further important to appreciate that such compounded rubber components must be identified in some manner, usually by rubber compound, batch number and preparation date, so that they are not stored for too long a period before use and so they are built into the correct tire construction.

Such identification is often accomplished by loosely or releasably attaching or applying an identification tag to the compounded rubber component.

If such an identification tag should, by accident not be removed from its labeled rubber component, the tag could conceivably become embedded within the elements of the tire construction and become a foreign material to the tire which, after fabrication, shaping and curing of the tire, might not be readily visually detected.

DISCLOSURE AND PRACTICE OF THE INVENTION

In accordance with this invention, in a method of constructing a pneumatic or semi-pneumatic tire by the process of building its elements together followed by shaping and curing the construction where at least one of its elements is comprised of a heat-curable rubber composition, the improvement in which at least one of said rubber composition elements is identified prior to building it into the tire construction by a paper identification tag having a surface area of one of its two sides in the range of about 2 to about 30, preferably about 5 to about 16 square inches ($in^2$) releasably attached thereto having a printed ink composition thereon which covers about 10 to about 50, preferably about 20 to about 40 percent of the surface area of at least one side of said tag where said ink composition contains about 5 to about 25, preferably about 8 to about 15 weight percent, based on the total ink composition, of a heat activatible blowing agent.

The invention further relates to said identification tag.

The invention additionally relates to such tagged heat-curable rubber composition.

In the practice of building a tire, the identification tag is to be removed from its corresponding element prior to building the element into the tire construction.

In the practice of this invention, the tag is releasably attached to said heat-curable composition in a manner so that it can relatively easily be removed. For example, it might be attached with a small wire string or twine to the composition.

However, if, by mistake such tag should remain with its corresponding element or, in some other manner is built into the tire, following which it is cured therein, the value of the invention is particularly appreciated.

In said instance, the invention is demonstrated where, in the preparation of a pneumatic or semi-pneumatic tire where such tag is built into and within the tire construction following which the construction is shaped and cured at a temperature in the range of about 90° C. to about 150° C. the blowing agent in the ink composition on the tag is heat activated to release a gas to form a raised bubble or blister on the surface (inner or outer) of the hot tire after the tire's removal from its mold. This is particularly evident if the tag is trapped between an inner or outer layer of the tire and its supporting carcass ply. Such raised area or bubble or blister on the hot tire is normally about the size and shape of the tag, or at least about the size and shape of its inked portion and is generally easily and relatively quickly detected by visual inspection.

In the description of this invention, the identification tag is described as being of paper. In this regard, it is considered that paper is to be used in its broad sense as relating to paper stock having a general thickness in the range from about 0.002 to about 0.02, preferably about 0.003 to about 0.015, inches which also includes what is sometimes referred to as card or cardboard stock.

The ink for such tag is considered to be of conventional composition comprised of, for example, various conventional elements such as carbon black, various resin oils, toners and solvents. Indeed, the ink is often considered simply as somewhat of a carrier for the blowing agent.

In practice of this invention, it is normally desired that the ink composition, inclusive of solvent, contains about 5 to about 25 weight percent of the heat-activatible blowing agent.

The ink composition containing the blowing agent is simply printed onto the tag and allowed to dry in a conventional manner. The solvent is considered a minor portion of the ink composition (5–10 percent).

It is considered that preparation of the ink, its recipe, and the printing of the tag is done by rather conventional processes and methods well known to those having skill in these arts.

It is generally desired that the blowing agent be heat activatible at or less then the curing temperature of the tire but sufficiently above ambient room or factory temperature (20° C. to 45° C.) to prevent or inhibit premature blowing. A desired heat activation temperature range is for the blowing agent about 90° C. to about 150° C.

Upon heat activation, of course, the blowing agent breaks down or chemically decomposes to release the gaseous element or compound such as, for example, nitrogen or carbon dioxide, preferably nitrogen.

Representative of various heat activatible blowing agents are, for example, diazoaminobenzene, N,N'-dimethyl-N,N'-dinitrosoterephthalamide, benzensulfonyl hydrazide and sodium bicarbonate/stearic acid.

The practice of this invention is further illustrated by reference to the following example which is intended to be representative rather than restrictive of the scope of the invention. Unless otherwise indicated, all parts and percentages are by weight.

EXAMPLE I

For the purpose of illustrating this invention, several radial ply, tubeless pneumatic rubber ties of size P 205/75R15 were built on a building drum which were constructed of elements which included the conventional inner liner rubber gum stock, fabric-reinforced rubberized carcass and belt, beads and apex, pre-extruded sidewall rubber compositions and pre-extruded tread rubber compositions.

A heavy paper (cardboard) tag containing printed identification thereon for said sidewall element with its ink containing a heat activatible blowing agent was purposely built into the tire constructions in various places. For example, in one tire it was placed between the inner surface of the outer sidewall element and the outer surface of its supporting carcass ply element and in another tire it was placed between the inner liner and the fabric-reinforced carcass.

The constructed tires were placed in a tire mold and cured at a temperature in the range of about 100° C. to about 150° C.

Upon removal from the mold, in one tire it was observed that the inner liner was ruptured at the position of the tag, apparently due to the gas released by the blowing agent. In another hot tire a blister about the size of the tag and about ⅜ inch thick was easily visable on its sidewall.

The tag was about 0.009 inch thick, 2.3 inches wide and 4.8 inches long. The ink of the printed matter covered about 35 percent of the area of one side of the tag. Thus the ink had a surface area of about 4 in$^2$. The ink had an estimated weight of about $4.3 \times 10^{-2}$ grams. The ink contained about 15 weight percent heat activatible blowing agent on a dry weight basis. Therefore, the tag represented about $6.4 \times 10^{-3}$ grams blowing agent for a tag surface area of about 11 in$^2$. The ink itself was considered somewhat conventional in nature.

What is claimed is:

1. An identification paper tag having a surface area of one of its two sides in the range of about 2 to about 30, preferably about 5 to about 16 square inches (in$^2$) and having an information-providing ink composition thereon which covers about 10 to about 50, preferably about 20 to about 40 percent of the surface area of at least one side of said tag where said ink composition contains about 5 to about 25, preferably about 8 to about 15 weight percent, based on the total ink composition, of a heat activatable blowing agent.

2. The identification tag of claim 1 where said paper tag has a thickness in the range of about 0.002 to about 0.02 inches where the area of one of its two sides is in the range of about 5 to about 16 square inches, the ink composition covers about 20 to about 40 percent of the surface of at least one side of the tag, the ink composition contains about 8 to about 15 weight percent heat activatable blowing agent, where said blowing is heat activatable in a temperature range of about 90° C. to about 150° C. to release nitrogen gas.

3. The identification tag of claim 1 where said blowing agent is selected from at least one of diazoaminobenzene, N,N'-dimethyl-N,N'-dinitrosoterephthalamide, benzensulfonyl hydrazide and sodium bicarbonate/stearic acid.

* * * * *